United States Patent
Zhang et al.

(10) Patent No.: US 12,486,465 B2
(45) Date of Patent: Dec. 2, 2025

(54) METHOD FOR PRODUCING HIGH QUALITY BASE OILS USING MULTIPLE STAGE PROCESSING

(71) Applicant: CHEVRON U.S.A. INC., San Ramon, CA (US)

(72) Inventors: Yihua Zhang, Albany, CA (US); Guan-Dao Lei, Walnut Creek, CA (US)

(73) Assignee: CHEVRON U.S.A. INC.

( * ) Notice: Subject to any disclaimer, the term of this patent is extended or adjusted under 35 U.S.C. 154(b) by 0 days.

(21) Appl. No.: 18/262,317

(22) PCT Filed: Jan. 18, 2022

(86) PCT No.: PCT/US2022/012705
§ 371 (c)(1),
(2) Date: Jul. 20, 2023

(87) PCT Pub. No.: WO2022/159360
PCT Pub. Date: Jul. 28, 2022

(65) Prior Publication Data
US 2024/0076565 A1 Mar. 7, 2024

Related U.S. Application Data

(63) Continuation of application No. 17/153,869, filed on Jan. 20, 2021, now abandoned.

(51) Int. Cl.
*C10G 45/62* (2006.01)
*B01J 29/74* (2006.01)
(Continued)

(52) U.S. Cl.
CPC ...... *C10G 67/0418* (2013.01); *B01J 29/7461* (2013.01); *C10G 45/62* (2013.01);
(Continued)

(58) Field of Classification Search
CPC . B01J 23/40; B01J 23/755; B01J 29/74; B01J 29/7461; C10G 2300/1022;
(Continued)

(56) References Cited

U.S. PATENT DOCUMENTS

| 3,852,207 A | 12/1974 | Stangeland |
| 6,103,101 A | 8/2000 | Fragelli et al. |

(Continued)

FOREIGN PATENT DOCUMENTS

| CN | 101089136 A | 12/2007 |
| CN | 103059974 B | 5/2015 |

(Continued)

OTHER PUBLICATIONS

International Search Report, issued on Apr. 29, 2022, during the prosecution of International Application No. PCT/US2022/012705.
(Continued)

*Primary Examiner* — Ellen M McAvoy
*Assistant Examiner* — Chantel Graham
(74) *Attorney, Agent, or Firm* — Mark Warzel

(57) ABSTRACT

Described are processes to produce base oils with one more improved properties, e.g., lower aromatics, economically and/or efficiently. In some embodiments the processes comprise a step that reduces the amount of residual refractory sulfur compounds prior to or simultaneous with a hydrofinishing step which advantageously provides base oils with lower aromatics than comparable processes.

17 Claims, 2 Drawing Sheets

(51) Int. Cl.
  *C10G 45/64* (2006.01)
  *C10G 65/04* (2006.01)
  *C10G 67/04* (2006.01)

(52) U.S. Cl.
  CPC .......... *C10G 45/64* (2013.01); *C10G 65/043* (2013.01); *C10G 2300/1022* (2013.01); *C10G 2300/304* (2013.01); *C10G 2400/10* (2013.01)

(58) Field of Classification Search
  CPC ........ C10G 2300/202; C10G 2300/304; C10G 2400/10; C10G 45/06; C10G 45/52; C10G 45/60; C10G 45/62; C10G 45/64; C10G 65/043; C10G 67/0418
  See application file for complete search history.

(56) References Cited

U.S. PATENT DOCUMENTS

| | | |
|---|---|---|
| 7,141,529 B2 | 11/2006 | Biscardi |
| 8,882,989 B2 | 11/2014 | Rosenbaum et al. |
| 2008/0083657 A1 | 4/2008 | Zones |
| 2009/0120838 A1 | 5/2009 | Miller et al. |
| 2011/0079540 A1 | 4/2011 | Krishna |
| 2015/0175911 A1* | 6/2015 | Shih ...................... C10G 69/02 208/97 |
| 2016/0194566 A1 | 7/2016 | Hoo et al. |
| 2016/0304795 A1* | 10/2016 | Lanci ..................... C10G 45/52 |
| 2017/0056868 A1* | 3/2017 | Ojo ...................... B01J 29/7023 |
| 2020/0299142 A1 | 9/2020 | Ojo et al. |

FOREIGN PATENT DOCUMENTS

| | | |
|---|---|---|
| CN | 108137332 A | 6/2018 |
| RU | 2513105 C2 | 4/2014 |
| TW | 201718837 A | 6/2017 |
| WO | 2020222171 | 11/2020 |

OTHER PUBLICATIONS

Written Opinion of the International Searching Authority, issued on Apr. 29, 2022, during the prosecution of International Application No. PCT/US2022/012705.

E.P. Barrett, L.G. Joyner and P.P. Halenda, "The determination of pore volume and area distributions in porous substances. I. Computations from nitrogen isotherms" J. Am. Chem. Soc. 1951 73, 373-380.

* cited by examiner

METHOD FOR PRODUCING HIGH QUALITY BASE OILS USING MULTIPLE STAGE PROCESSING

CROSS REFERENCE TO RELATED APPLICATIONS

This application is related to the following applications, and claims the benefit of priority thereto, as a 371 application of PCT/US2022/012705, filed on Jan. 18, 2022, which is the international application based on and a continuation of U.S. patent application Ser. No. 17/153,869, filed on Jan. 20, 2021, the disclosures of which are herein incorporated in their entirety.

FIELD OF THE INVENTION

The present disclosure relates to methods for producing high quality base oils using, for example, novel methods comprising a step for reducing the amount of residual refractory sulfur compounds prior to or simultaneous with a hydroprocessing step.

BACKGROUND AND SUMMARY

Modern refining processes for producing lubricating oils from crudes typically use a number of hydrogen processes. The processes are employed to produce lubricating oils having suitable lubricating properties over a wide range of operating conditions. Hydrotreating/hydrocracking is generally an upgrading process for increasing viscosity index by removing low viscosity index molecules, including molecules containing sulfur and nitrogen. Hydrodewaxing is typically a process for improving the low temperature properties by isomerizing the long chain waxy molecules, if otherwise not removed, may have a negative impact on the pour and cloud points of the fractions. Hydrofinishing typically describes a process to further upgrade the lubricating base oil quality including color and oxidation stability often by saturating the aromatic molecules. However, in many cases the base oil still may have undesirable levels of aromatics, residual organic sulfur, and/or nitrogen. Accordingly, it would be desirable if additional or alternative processes were discovered for economically and efficiently producing base oil with one or more improved properties.

Advantageously, the instant processes economically and/or efficiently produce base oils with one more improved properties, e.g., lower aromatics. In one embodiment the application relates to a process for producing a low aromatic base oil. The process comprises contacting a first SSZ-91 isomerized stream comprising an amount of residual refractory sulfur compounds with a base metal catalyst under conditions to provide a second isomerized stream comprising a lesser amount of residual refractory sulfur compounds than the first isomerized stream. The second isomerized stream is then contacted with a noble metal hydrofinishing catalyst under hydrofinishing conditions to provide a hydrofinished stream.

In another embodiment the application pertains to a process for producing a low aromatic base oil comprising: contacting a first isomerized stream comprising an amount of residual refractory sulfur compounds with a base metal catalyst comprising nickel under conditions to provide a second isomerized stream comprising a lesser amount of residual refractory sulfur compounds than the first isomerized stream wherein the conditions comprising a temperature of from about 130° F. to about 230° F. The second isomerized stream is then contacted with a noble metal hydrofinishing catalyst comprising a silica alumina support and a noble metal selected from palladium, platinum, or a combination thereof. The noble metal content is from about 0.1 to about 1.0 wt. %. The contacting is conducted under hydrofinishing conditions to provide a hydrofinished stream. The hydrofinishing conditions comprise a pressure in the range from about 15 to about 3000 psig and a of from about 350° F. to about 500° F. A base oil produced by the process may comprise less than 0.4% by weight aromatics.

Further features of the disclosed design, and the advantages offered thereby, are explained in greater detail hereinafter with reference to specific example embodiments illustrated in the accompanying drawings.

DETAILED DESCRIPTION

Figure 1:
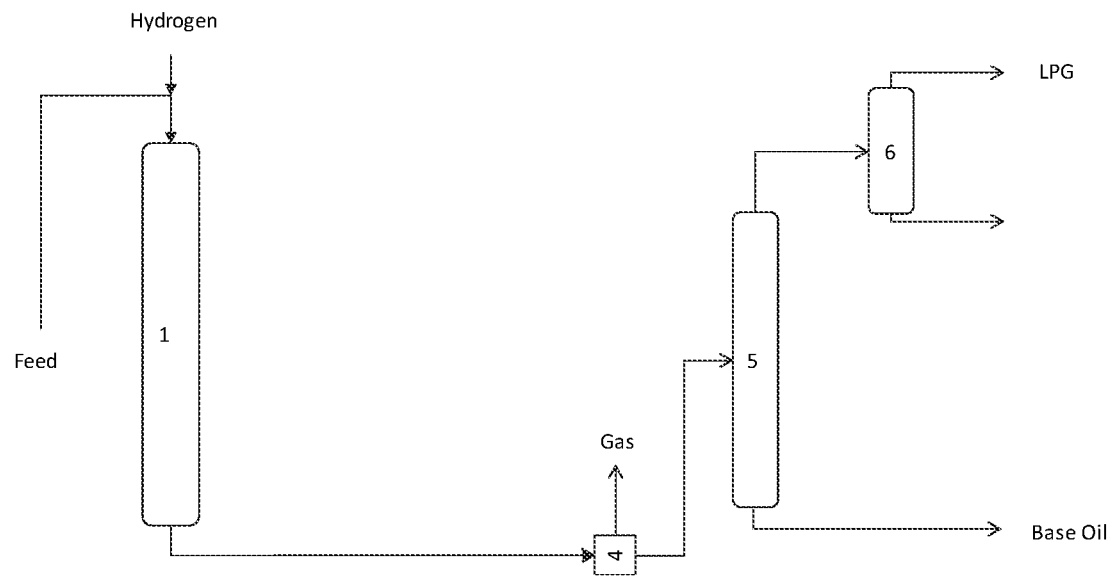
FIG. 1 depicts a comparative simplified process flow scheme with one hydrodewaxing stage followed by product separation systems.

Although illustrative embodiments of one or more aspects are provided herein, the disclosed processes may be implemented using any number of techniques. The disclosure is not limited to the illustrative or specific embodiments, drawings, and techniques illustrated herein, including any exemplary designs and embodiments illustrated and described herein, and may be modified within the scope of the appended claims along with their full scope of equivalents.

The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

Definitions

The following terms used herein have the meanings as defined herein below, unless otherwise indicated.

The term "hydrotreating" refers to processes or steps performed in the presence of hydrogen for the hydrodesulfurization, hydrodenitrogenation, hydrodemetallation, and/or hydrodearomatization of components (e.g., impurities) of a hydrocarbon feedstock, and/or for the hydrogenation of unsaturated compounds in the feedstock. Depending on the type of hydrotreating and the reaction conditions, products of hydrotreating processes may have improved aromatic content, viscosities, viscosity indices, saturates content, low temperature properties, volatilities and depolarization, for example.

As used herein the term "molecular sieve" refers to a crystalline material containing pores, cavities, or interstitial spaces of a uniform size in which molecules small enough to pass through the pores, cavities, or interstitial spaces are adsorbed while larger molecules are not. Examples of molecular sieves include zeolites and non-zeolite molecular sieves such as zeolite analogs including, but not limited to, SAPOs (silicoaluminophosphates), MeAPOs (metalloalummophosphates), $AlPO_4$, and ELAPOs (nonmetal substituted aluminophosphate families).

As used herein, the term "pour point" refers to the temperature at which an oil will begin to flow under controlled conditions. The pour point may be determined by, for example, ASTM D5950.

"Target pour point" means the desired or required pour point of a lubricant base oil product. The target pour point is generally less than about −10° C., and typically in the range from about −10° C. to −50° C.

As used herein, "cloud point" refers to the temperature at which a lube oil sample begins to develop a haze as the oil is cooled under specified conditions. The cloud point of a lube base oil is complementary to its pour point. Cloud point may be determined by, for example, ASTM D5773.

The "pour point/cloud point spread," or "pour-cloud spread" of a base oil, refers to the spread or difference between the cloud point and the pour point, and is defined as the cloud point minus the pour point, as measured in ° C. Generally, it is desirable to minimize the spread between the pour and cloud points.

The Periodic Table of the Elements referred to in this disclosure is the CAS version published by the Chemical Abstract Service in the Handbook of Chemistry and Physics, 72nd edition (1991-1992).

"Group VIII metal" refers to elemental metal(s) selected from Group VIII of the Periodic Table of the Elements and/or to metal compounds comprising such metal(s).

Unless otherwise specified, the "feed rate" of a hydrocarbon or other feedstock being fed to a catalytic reaction zone is expressed herein as the volume of feed per volume of catalyst per hour, which may be referred to as liquid hourly space velocity (LHSV) with units of reciprocal hours ($h^{-1}$).

The term "hydroisomerization" refers to a process in which n-paraffins (n-alkanes) are isomerized to their more branched counterparts in the presence of hydrogen over a hydroisomerization (dewaxing) catalyst.

Unless otherwise specified, the recitation of a genus of elements, materials, or other components from which an individual component or mixture of components can be selected is intended to include all possible sub-generic combinations of the listed components and mixtures thereof. Also, "include" and its variants are intended to be non-limiting, such that recitation of items in a list is not to the exclusion of other like items that may also be useful in the materials, compositions, and methods of this invention.

Properties for the Materials Described Herein may be Determined in Some Embodiments as Follows:

(a) $SiO_2/Al_2O_3$ Ratio (SAR): determined by ICP elemental analysis. A SAR of infinity (∞) represents the case where there is no aluminum in the zeolite, i.e., the mole ratio of silica to alumina is infinity. In that case, the molecular sieve is comprised essentially of all silica.

(b) Surface area: determined by $N_2$ adsorption at its boiling temperature. BET surface area is calculated by the 5-point method at $P/P_0$=0.050, 0.088, 0.125, 0.163, and 0.200. Samples are first pre-treated at 400° C. for 6 hours in the presence of flowing, dry $N_2$ so as to eliminate any adsorbed volatiles like water or organics.

(c) Micropore volume: determined by $N_2$ adsorption at its boiling temperature. Micropore volume is calculated by the t-plot method at $P/P_0$=0.050, 0.088, 0.125, 0.163, and 0.200. Samples are first pre-treated at 400° C. for 6 hours in the presence of flowing, dry $N_2$ so as to eliminate any adsorbed volatiles like water or organics.

(d) Mesopore pore diameter: determined by $N_2$ adsorption at its boiling temperature. Mesopore pore diameter is calculated from $N_2$ isotherms by the BJH method described in E. P. Barrett, L. G. Joyner and P. P. Halenda, "The determination of pore volume and area distributions in porous substances. I. Computations from nitrogen isotherms" J. Am. Chem. Soc. 1951 73, 373-380. Samples are first pre-treated at 400° C. for 6 hours in the presence of flowing, dry $N_2$ so as to eliminate any adsorbed volatiles like water or organics.

(e) Total pore volume: determined by $N_2$ adsorption at its boiling temperature at $P/P_0$=0.990. Samples are first pre-treated at 400° C. for 6 hours in the presence of flowing, dry $N^2$ so as to eliminate any adsorbed volatiles like water or organics.

(f) Aromatic weight percent is determined by UV absorption at wavelengths from 220 nm to 400 nm as in ASTM D2008.

By using the aromatics content in the dewaxed product, the conversion of aromatics is calculated by the following formula: $X=(C_{feed}-C_{product})/C_{feed}*100$.

Where permitted, all publications, patents and patent applications cited in this application are incorporated by reference herein in their entirety, to the extent such disclosure is not inconsistent with the present invention.

General Processes of the Present Application Using a Sulfur Reduction Step

The processes of the present application generally comprise isomerization and/or hydrofinishing processes with a sulfur reduction step prior to or simultaneous with a hydrofinishing step to produce low aromatic base oils. Typically, the processes comprise a sulfur reduction step of contacting a first isomerized stream with a base metal catalyst under conditions to provide a second isomerized stream comprising a lesser amount of residual refractory sulfur compounds than the first isomerized stream. The second isomerized stream comprising the lesser amount of residual refractory sulfur compounds is contacted with a noble metal hydrofinishing catalyst under hydrofinishing conditions to provide a hydrofinished stream.

The conditions and catalyst employed when contacting the first isomerized stream with a base metal catalyst may vary depending upon the feedstocks and desired base oil product and properties. Typically, conditions such as pressure, temperature, feed rate, and catalyst are selected such that the second isomerized stream may be hydrofinished in a conventional manner to produce base oils with less than about 0.4%, or less than about 0.35%, or less than about 0.3%, or less than about 0.2% by weight aromatics. In other embodiments, the total aromatics in a base oil produced by the process may be at least about 60% less, or at least about 55% less, or at least about 50% less, or at least about 45% less, or at least about 40% less than a comparable process lacking the step for reducing residual refractory sulfur compounds.

Typical conditions for the sulfur reducing step such as pressure, temperature, contact time, feed rate, catalyst, and amount of sulfur reduction may include, for example, a temperature of at least about 130° F., or at least about 150° F., or at least about 160° F., or at least about 170° F. up to about 230° F., or up to about 220° F., or up to about 210° F., or up to about 200° F., or up to about 190° F.; a pressure in the range of about 1800-2400 psi, or about 2000-2200 psi; a liquid hourly space velocity (LHSV) in the range of about 0.8-1.5 hr$^{-1}$, or about 1.0-1.4 hr$^{-1}$, or about 1.1-1.3 hr$^{-1}$; and a sulfur reduction in the range of about 20-80%, or about 20-60%, or about 30-50%. Useful catalysts may include base metal catalysts comprising, for example, nickel.

Figure 3:
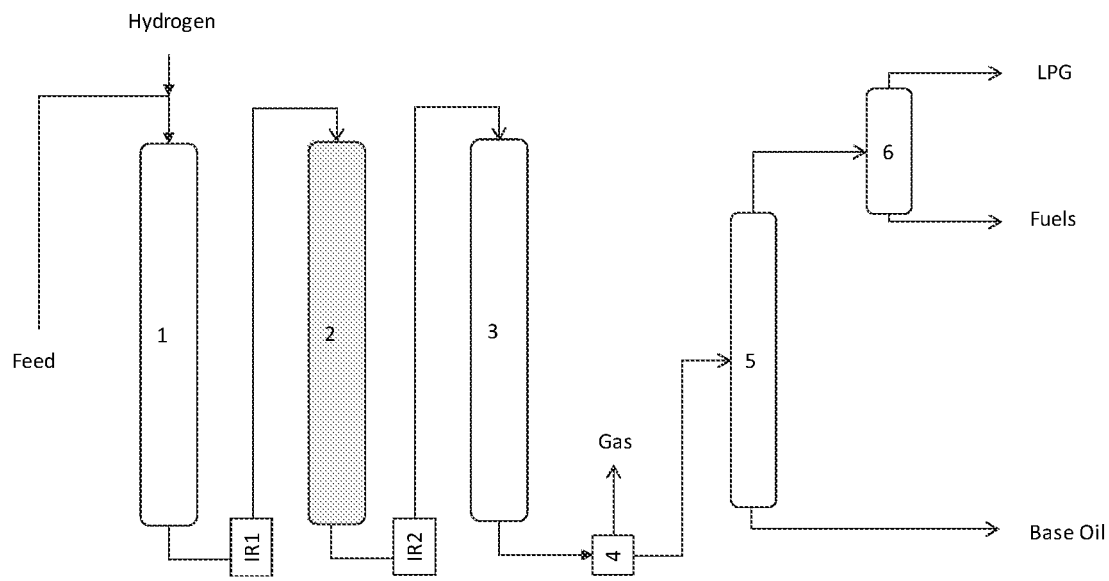
FIG. 3 depicts a simplified process flow scheme with one hydrodewaxing stage followed by two hydrofinishing stages and product separation systems

The sulfur reducing step may be conducted prior to or simultaneous with hydrofinishing. That is, the first isomerized stream may be contacted with the base metal catalyst in a reactor separate from and prior to the hydroisomerization reactor as shown in FIG. 3.

Alternatively, the sulfur reducing step may be conducted in the same reactor as hydrofinishing by first contacting the first isomerized stream with the base metal catalyst to produce the second isomerized stream comprising a lesser amount of residual refractory sulfur compounds than the first isomerized stream and then contacting the second isomerized stream with hydrofinishing catalyst. This may be accomplished in any convenient manner. In one embodiment the base metal catalyst is loaded near an entrance of the reactor while the hydrofinishing catalyst is loaded nearer an exit of the reactor. In some embodiments the base metal catalyst and hydrofinishing step may be mixed. Additionally or alternatively, the first isomerized stream may be contacted in alternating stages of base metal catalyst and hydrofinishing catalyst.

Useful isomerization and hydrofinishing conditions and catalysts are described below.

Hydrofinishing Units

The isomerization feedstock is typically fed to a one or more hydrofinishing units to make one or more hydrofinished streams ultimately to provide a suitable quality and yield of the desired base oil product. Such a hydrofinishing step or steps, may remove traces of any aromatics, olefins, color bodies, and the like from the base oil product. The hydrofinishing unit may include a hydrofinishing catalyst comprising a silica alumina support and a noble metal, typically palladium, or platinum in combination with palladium. In an embodiment, the noble metal content of the hydrofinishing catalyst may typically be in the range from about 0.1 to about 1.0 wt. %, usually from about 0.1 to about 0.6 wt. %, and often from about 0.2 to about 0.5 wt. %.

Hydrofinishing may be performed in the presence of a hydrogenation catalyst which may also be referred to as a hydrofinishing catalyst, as is known in the art. The hydrogenation catalyst used for hydrofinishing may comprise, for example, platinum, palladium, or a combination thereof on a silica alumina support. The hydrofinishing may be performed at a temperature in the range from about 350° F. to about 650° F. (204° C. to 343° C.), and a pressure in the range from about 400 psig to about 4000 psig (2.76 to 27.58 MPa). Hydrofinishing for the production of lubricating oils is described, for example, in U.S. Pat. No. 3,852,207, the disclosure of which is incorporated by reference herein.

Within the reactor, the feed may be contacted with a hydrotreating catalyst under hydrotreating conditions. Contacting the feedstock with the hydrotreating catalyst serve to effectively hydrogenate aromatics in the feedstock, and in some cases remove some N- and S-containing compounds from the feed. By "effectively hydrogenate aromatics" is meant that the hydrotreating catalyst is able to decrease the aromatic content of the feedstock by at least about 20%. The hydrotreated feedstock may generally comprise $C_{10+}$ n-paraffins and slightly branched iso-paraffins, with a wax content of typically at least about 20%. The hydrotreated feedstock may first be contacted with the hydroisomerization catalyst under hydroisomerization dewaxing conditions to provide an isomerization stream. The hydrotreating and hydroisomerization conditions that may be used for catalytic dewaxing processes of the present invention are described herein below.

Hydrofinishing Catalysts

In an embodiment, catalyst systems of the present invention may include a hydrofinishing which also may be referred to hydrotreating or hydrogenation catalyst. Hydrotreating catalysts useful in the present invention may comprise a refractory inorganic oxide support and a Group VIII metal. The oxide support may also be referred to herein as a binder. The support of the hydrotreating catalyst may be prepared from or comprise alumina, silica, silica/alumina, titania, magnesia, zirconia, and the like, or combinations thereof. The catalyst support may comprise amorphous materials, crystalline materials, or combinations thereof. Examples of amorphous materials include, but are not limited to, amorphous alumina, amorphous silica, amorphous silica-alumina, and the like.

In an embodiment, the support may comprise amorphous alumina. When using a combination of silica and alumina, the distribution of silica and alumina in the support may be either homogeneous or heterogeneous. In some embodiments, the support may consist of an alumina gel in which is dispersed the silica, silica/alumina, or alumina base material. The support may also contain refractory materials other than alumina or silica, such as for example other inorganic oxides or clay particles, provided that such materials do not adversely affect the hydrogenation activity of the final catalyst or lead to deleterious cracking of the feedstock.

In a sub-embodiment, silica and/or alumina will generally comprise at least about 90 wt. % of the support of the hydrotreating catalyst, and in some embodiments the support may be at least substantially all silica or all alumina. Regardless of the type of support material in the hydrotreating catalyst, the hydrotreating catalyst used in processes and catalyst systems of the present invention will typically have low acidity. Where appropriate, the acidity of the support can be decreased by treatment with alkali and/or alkaline earth metal cations.

Various crystalline and non-crystalline catalyst support materials that may be used in practicing the present invention, as well as the quantification of their acidity levels and methods for neutralizing acid sites in the catalyst support, are described in co-pending, commonly assigned U.S. Patent Application Publication No. 2011/0079540, the disclosure of which is incorporated by reference herein in its entirety.

The Group VIII metal component(s) of the hydrotreating catalyst may comprise platinum, palladium, or combinations thereof. In an embodiment, the hydrotreating catalyst comprises platinum and palladium with a Pt:Pd ratio in the range from about 5:1 to about 1:5, typically from about 3:1 to about 1:3, and often from about 1:1 to about 1:2. The Group VIII metal content of the hydrotreating catalyst may generally be in the range from about 0.01 wt. % to about 5 wt. %, typically from about 0.2 wt. % to about 2 wt. %. In an embodiment, the hydrotreating catalyst may comprise platinum at a concentration in the range from about 0.1 to about 1.0 wt. %, and palladium at a concentration in the range from about 0.2 to about 1.5 wt. %.

In an embodiment, the Group VIII metal of the hydrotreating catalyst may be dispersed on the inorganic oxide support. A number of methods are known in the art to deposit platinum and/or palladium metal, or compounds comprising platinum and/or palladium, onto the support; such methods include ion exchange, impregnation, and co-precipitation. In an embodiment, the impregnation of the support with platinum and/or palladium metal may be performed at a controlled pH value. The platinum and/or palladium is typically added to the impregnating solution as a metal salt, such as a halide salt, and/or an amine complex, and/or a salt of a mineral acid. Ammonium salts have been found to be particularly useful in preparing solutions for Group VIII metal impregnation. Other examples of metal salts that may be used include nitrates, carbonates, and bicarbonates, as well as carboxylic acid salts such as acetates, citrates, and formates.

Optionally, the impregnated support may be allowed to stand with the impregnating solution, e.g., for a period in the range from about 2 to about 24 hours. Following impregnation of the oxide support with the Group VIII metal, the impregnated support can be dried and/or calcined. After the hydrotreating catalyst has been dried and calcined, the prepared catalyst may be reduced with hydrogen, as is conventional in the art, and placed into service.

Typically, the hydrotreating catalyst may comprise from about 5% to about 20% of the total catalyst volume, and usually from about 5% to about 15% of the total catalyst volume.

Isomerized Stream, Catalysts and Reaction Conditions

Generally, the isomerized stream for the sulfur reduction step may be obtained in any convenient manner which may vary depending upon the specific conditions of the feedstock, the desired properties for the base oil, and other factors. The isomerization streams that are useful are not particularly limited and may vary depending upon the desired product, isomerization, hydrofinishing, and/or other conditions, catalysts employed, and so forth. Isomerization conditions and catalysts may vary widely. Typically, a hydrocarbon feedstock is contacted with the hydroisomerization catalyst under hydroisomerization dewaxing conditions to provide an isomerization stream. The isomerized stream may be produced by contacting a hydrocarbon feedstock with hydrogen and a noble metal hydroisomerization catalyst under hydroisomerization dewaxing conditions to provide the isomerized stream.

The noble metal hydroisomerization catalyst may vary but in some embodiments comprises a crystalline molecular sieve SSZ-91 and platinum. Such SSZ-91 catalysts are described in detail in U.S. Pat. No. 10,618,816 entitled "Molecular sieve SSZ-91, methods for preparing SSZ-91, and uses for SSZ-91" which is incorporated herein by reference. Similarly, the hydroisomerization dewaxing conditions may vary but in some embodiments comprise a temperature of from about 550° F. to about 700° F., and preferably from 590° F. to about 675° F. In some embodiments the hydroisomerization dewaxing conditions comprise a pressure in the range from about 15 to about 3000 psig and preferably in the range from about 100 to about 2500 psig.

The hydroisomerization dewaxing conditions may comprise a hydrocarbon feedstock feed rate in the range of from about 0.1 to about 20 $hr^{-1}$ LHSV in the presence of hydrogen wherein the hydrogen to hydrocarbon ratio is in a range from about 2000 to about 10,000 standard cubic feet per barrel hydrocarbon. In other embodiments the hydrocarbon feedstock feed rate may be from about 0.1 to about 5 $hr^{-1}$ LHSV.

The hydrogen to hydrocarbon ratio may be from about 2500 to about 5000 standard cubic feet per barrel hydrocarbon in some embodiments.

The hydroisomerization catalysts may comprise a 1-D, 10-ring molecular sieve and a Group VIII metal, e.g., substantially as described herein above under "Hydroisomerization Catalysts." The hydroisomerization catalysts may be selective for the isomerization of n-paraffins in the feedstock, such that feedstock components are preferentially isomerized rather than cracked.

Hydroisomerization Catalysts

In an embodiment, processes of the present invention use a hydroisomerization catalyst selective for the isomerization of n-paraffins in the hydrocarbon feed. Useful hydroisomerization catalysts may comprise a molecular sieve and a Group VIII metal. In an embodiment, the molecular sieve of the hydroisomerization catalyst may comprise a 1-D, 10-ring molecular sieve. The Group VIII metal of the first and second hydroisomerization catalysts may comprise platinum, palladium, or a combination thereof. In an embodiment, the hydroisomerization catalysts may comprise from about 0.1 to about 1.5 wt. % of the Group VIII metal, typically from about 0.2 to about 1.0 wt. %, and usually from about 0.325 to about 1.0 wt. % of the Group VIII metal. In an embodiment, the hydroisomerization catalysts may further comprise a metal modifier selected from the group consisting of Mg, Ca, Sr, Ba, K, La, Pr, Nd, Cr, and combinations thereof, substantially as described herein below.

Typically, the hydroisomerization catalysts will still further comprise a support or binder. The support may comprise a refractory inorganic oxide. Suitable inorganic oxide supports for the hydroisomerization catalysts include silica, alumina, titania, magnesia, zirconia, silica-alumina, silica-magnesia, silica-titania, and the like, and combinations thereof. The hydroisomerization catalysts may comprise from about 5 to about 95 wt. % or more of the molecular sieve component, typically from about 15 to about 85 wt. % of the molecular sieve, and usually from about 25 to about 75 wt. % of the molecular sieve. Generally, it is advantageous to minimize the molecular sieve component for economic reasons, provided that the catalyst retains the required activity and selectivity levels. The hydroisomerization catalysts may comprise from about 0 to about 95 wt. % of the support material, and more typically from about 5 to about 90 wt. %.

In an exemplary catalyst system for dewaxing hydrocarbon feedstocks according to processes of the present invention, each the hydroisomerization catalyst may comprise a 1-D, 10-ring molecular sieve and a Group VIII metal. The molecular sieve of the hydroisomerization catalysts may comprise a medium pore zeolite, e.g., a zeolite having a pore aperture in the range from about 0.39 nm to about 0.7 nm. In an embodiment, each of the hydroisomerization catalysts may further comprise from about 0.325 wt. % to about 1 wt. % platinum.

Examples of molecular sieves that may be useful in formulating hydroisomerization catalysts include molecular sieves of the AEL framework type code, such as SAPO-11, SAPO-31, SM-3, SM-6; as well as zeolite type materials of the MTT or TON codes. Molecular sieves of the MTT code include ZSM-23, SSZ-32, EU-13, ISI-4, and KZ-1. Molecular sieves of the TON code that may be useful in practicing the present invention include Theta-1, ISI-1, KZ-2, NU-10, and ZSM-22. The parameters of MTT and TON type molecular sieves are further described in the Atlas of Zeolite Framework Types which is published by the International Zeolite Association (IZA). In an embodiment, the hydroisomerization catalysts contain zeolite SSZ-32. In a sub-embodiment, the hydroisomerization catalysts contain SSZ-32. Processes of the present invention are not limited to any particular hydroisomerization catalyst formulations.

Metal Loading of Catalysts

In an embodiment, the hydroisomerization catalysts may further comprise one or more metal modifier(s). Typically, the metal modifier(s) may be selected from the group consisting of Mg, Ca, Sr, Ba, K, La, Pr, Nd, Cr, and combinations thereof. In a sub-embodiment, the metal modifier may comprise Mg. As a non-limiting example, the hydroisomerization catalysts may comprise a 1-D, 10-ring molecular sieve, such as SSZ-32; a Group VIII noble metal, such as platinum; and in some embodiments a metal modifier such as magnesium. In an embodiment, a metal-modified catalyst of the present invention may comprise from about 0.5 to about 3.5 wt. % of Mg or other metal modifier(s), typically from about 0.5 to about 2.5 wt. %, and usually from about 0.9 to about 2.5 wt. % of Mg or other metal modifier(s).

In formulating a catalyst or catalyst system for dewaxing processes of the present invention, a mixture of a molecular sieve and an oxide binder may be formed into a particle or extrudate having a wide range of physical shapes and dimensions. In an embodiment, the extrudate or particle may be dried and calcined prior to metal loading. Calcination may be performed at temperatures typically in the range from about 390° F. to about 1100° F. (199° C. to 593° C.) for periods of time ranging from about 0.5 to about 5 hours, or more. The calcined extrudate or formed particle may then be loaded with at least one metal modifier selected from the group consisting of Ca, Cr, Mg, La, Na, Pr, Sr, K, Nd, and combinations thereof. While not being bound by theory, such metals may effectively reduce the number of acid sites on the molecular sieve of the metal-modified hydroisomerization catalyst, thereby increasing the catalyst's selectivity for isomerization (versus cracking) of n-paraffins in the feed. The loading of modifying metal(s) on the catalyst(s) may be accomplished by techniques known in the art, such as by impregnation or ion exchange. Ion exchange techniques typically involve contacting the extrudate or particle with a solution containing a salt of the desired metal cation(s). A variety of metal salts, such as halides, nitrates, and sulfates, may be used in this regard. Following contact with a salt solution of the desired metal cation(s), the extrudate or particle may be dried, e.g., at temperatures in the range from about 150° F. to about 800° F. (66° C. to 427° C.). The extrudate or particle may thereafter be further loaded with a Group VIII metal component of the catalyst.

In an embodiment, a molecular sieve or catalyst of the invention may be co-impregnated with a modifying metal and a Group VIII metal. After loading the Group VIII and modifying metals, the catalyst may be calcined in air or inert gas at temperatures in the range from about 500° F. to about 900° F. (260° C. to 482° C.). The preparation of molecular sieve catalysts comprising a metal modifier is disclosed in commonly assigned U.S. Pat. No. 7,141,529 and in U.S. Patent Application Publication No. 2008/0083657, the disclosure of each of which is incorporated by reference herein in its entirety.

Isomerization and Hydrofinishing Reaction Conditions

The conditions under which processes of the present invention are carried out will generally include a temperature within a range from about 390° F. to about 800° F. (199° C. to 427° C.). In an embodiment, the hydroisomerization dewaxing conditions includes a temperature in the range from about 550° F. to about 700° F. (288° C. to 371° C.). In a further embodiment, the temperature may be in the range from about 590° F. to about 675° F. (310° C. to 357° C.). The pressure may be in the range from about 15 to about 3000 psig (0.10 to 20.68 MPa), and typically in the range from about 100 to about 2500 psig (0.69 to 17.24 MPa).

Typically, the feed rate to the catalyst system/reactor during dewaxing processes of the present invention may be in the range from about 0.1 to about 20 hr$^{-1}$ LHSV, and usually from about 0.1 to about 5 hr$^{-1}$ LHSV. Generally, dewaxing processes of the present invention are performed in the presence of hydrogen. Typically, the hydrogen to hydrocarbon ratio may be in a range from about 2000 to about 10,000 standard cubic feet per barrel hydrocarbon, and usually from about 2500 to about 5000 standard cubic feet per barrel hydrocarbon.

The above conditions may apply to the hydrotreating conditions of the hydrotreating zone as well as to the hydroisomerization conditions of one or more hydroisomerization zones. The reactor temperature and other process parameters may vary according to factors such as the nature of the hydrocarbon feedstock used and the desired characteristics (e.g., pour point, cloud point, VI) and yield of the base oil product.

The hydroisomerization catalysts may comprise a 1-D, 10-ring molecular sieve and a Group VIII metal, e.g., substantially as described herein above under "Hydroisomerization Catalysts." The hydroisomerization catalysts may be selective for the isomerization of n-paraffins in the feedstock, such that feedstock components are preferentially isomerized rather than cracked.

The hydrofinishing conditions under which processes of the present invention are carried out will generally include a temperature within a range from about 300° F. to about 600° F. (199° C. to 427° C.). In an embodiment, the hydrofinishing conditions include a temperature in the range from about 300° F. to about 700° F. (288° C. to 371° C.). In a further embodiment, the temperature may be in the range from about 400° F. to about 600° F. (310° C. to 357° C.). The pressure may be in the range from about 15 to about 3000 psig (0.10 to 20.68 MPa), and typically in the range from about 100 to about 2500 psig (0.69 to 17.24 MPa).

Typically, the feed rate to the catalyst system/reactor during hydrofinishing processes of the present invention may be in the range from about 0.1 to about 20 hr$^{-1}$ LHSV, and usually from about 0.1 to about 5 hr$^{-1}$ LHSV. Generally, hydrofinishing processes of the present invention are performed in the presence of hydrogen. Typically, the hydrogen to hydrocarbon ratio may be in a range from about 2000 to about 10,000 standard cubic feet per barrel hydrocarbon, and usually from about 2500 to about 5000 standard cubic feet per barrel hydrocarbon.

Base Oil Products

The base oil product may have a pour point not higher than about −9° C., typically not higher than about −12° C., and usually not higher than about −14° C. The base oil product may have a cloud point not higher than about −5° C., typically not higher than about −7° C., and usually not higher than about −12° C. The base oil product may have a pour-cloud spread of not more than about 7° C., typically not more than about 5° C., and usually not more than about 3° C. In an embodiment, the base oil product having the above properties may be obtained at a yield of at least about 89%.

In some embodiments, processes of the invention provide a high value, high quality lubricant oil in good yield from a low value waxy hydrocarbon feedstock. The lubricant oils of may have a pour point less than about −9° C., usually less than about −12° C., and often less than about −14° C., e.g., as measured by ASTM D97. In an embodiment, the lubricant oil product may have a pour point in the range from about −10° C. to about −30° C. The products may have viscosities in the range of 3 to 30 cSt at 100° C., and a VI in the range from about 95 to about 170 as measured by ASTM D445.

Feed for Base Oil Production

The instant invention may be used with a wide variety of hydrocarbon feedstocks, including whole crude petroleum, reduced crudes, vacuum tower residua, cycle oils, synthetic crudes, gas oils, vacuum gas oils, foots oils, Fischer-Tropsch derived waxes, and the like. In an embodiment, the hydrocarbon feedstocks can be described as waxy feeds having pour points generally above about 0° C., and having a tendency to solidify, precipitate, or otherwise form solid particulates upon cooling to about 0° C. Straight chain n-paraffins, either alone or with only slightly branched chain paraffins, having 16 or more carbon atoms may be referred to herein as waxes. The feedstock will usually be a $C_{10+}$ feedstock generally boiling above about 350° F. (177° C.).

In an embodiment, the feedstock may comprise a heavy feed. Herein, the term "heavy feed" may be used to refer to a hydrocarbon feedstock wherein at least about 80% of the components have a boiling point above about 900° F. (482° C.). Examples of heavy feeds suitable for practicing the present invention include heavy neutral (600N) and bright stock.

In an embodiment, the hydrocarbon feedstocks of the present invention may generally have a pour point above 0° C., and in some embodiments above about 20° C. In contrast, the base oil products of processes of the present invention, generally have pour points below 0° C., typically below about −12° C., and often below about −14° C.

In an embodiment, the feedstock employed in processes of the present invention can be a waxy feed which contains more than about 20% wax, more than about 50% wax, or even greater than about 70% wax. More typically, the feed will contain from about 5% to about 30% wax. As used herein, the term "waxy hydrocarbon feedstocks" may include plant waxes and animal derived waxes in addition to petroleum derived waxes.

According to one aspect of the present invention, a wide range of feeds may be used to produce lubricant base oils in high yield with good performance characteristics, including low aromatics, low pour point, low cloud point, low pour-cloud spread, and high viscosity index. The quality and yield of the lube base oil product of the instant invention may depend on a number of factors, including, but not limited to, the hydrofinishing steps and conditions described herein.

EXAMPLES

Comparative Example 1

Comparative Example 1 is a comparative example which employs stage 1 only followed by product separation systems 4, 5 and 6 as shown in FIG. 1 simplified process flow scheme. A noble metal hydroisomerization catalyst was installed in stage 1 reactor. This noble metal catalyst was composited with crystallite SSZ-91 and platinum. The $1^{st}$ stage is also denoted as hydrodewaxing stage. A "heavy neutral" feed (HN) was used to evaluate this process configuration. Table 1 lists the feed properties.

FIG. 1 key: 1—$1^{st}$ stage, 4—High pressure separator, 5—Distillation system, and 6—Debutanizer.

TABLE 1

| HN Feed Properties | |
|---|---|
| Property | Value |
| API Gravity | 29.6 |
| N, ppm | 1 |
| S, ppm | 32 |
| Aromatics, lv % | 18 |
| SIMDIST TBP (WT %), ° F. | |
| TBP @0.5 | 716 |
| TBP @5 | 808 |
| TBP @10 | 842 |
| TBP @30 | 909 |
| TBP @50 | 950 |
| TBP @70 | 990 |
| TBP @90 | 1043 |
| TBP @95 | 1065 |
| TBP @99.5 | 1110 |

The reaction was performed in a micro unit with the described configuration and the run was operated under 2100 psig total pressure. Prior to the introduction of feed, the catalysts were activated by a standard reduction procedure. The HN feed was passed through the hydrodewaxing reactor at a LHSV of 1.2 $hr^{-1}$ and then hydrofinished in 102. The hydrogen to oil ratio was about 3000 scfb. The lube unfinished product was separated from fuels through the distillation section. Product aromatics content was determined.

The $1^{st}$ stage reactor was operated at 600-650° F. to convert the wax molecules to reach the product pour point target. By using the aromatics content in the dewaxed product, the conversion of aromatics is calculated by the following formula: $X=(C_{feed}-C_{product})/C_{feed}*100$.

Comparative Example 2

Figure 2:
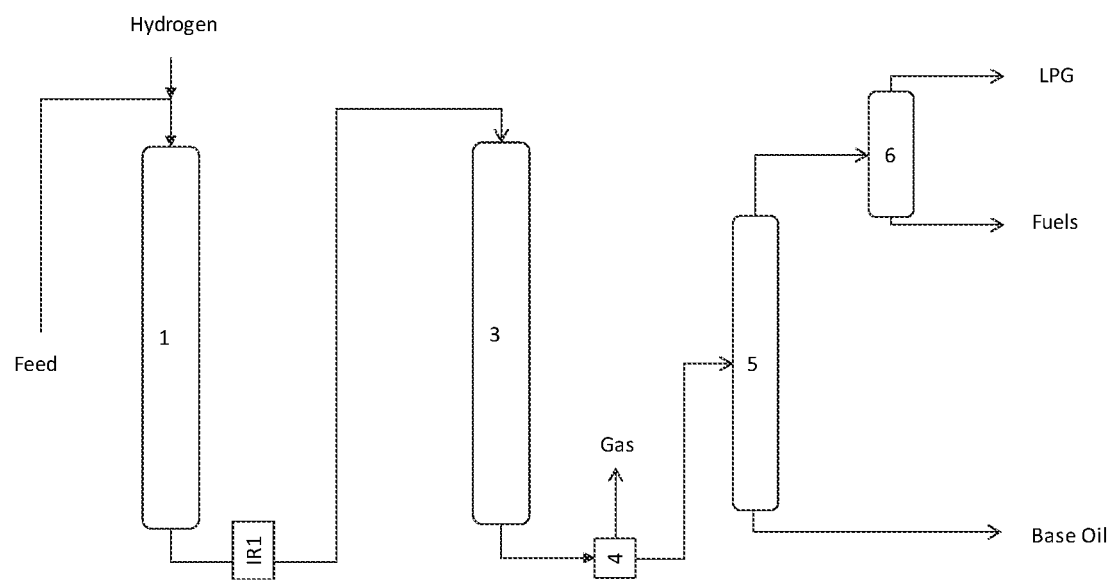
FIG. 2 depicts a comparative simplified process flow scheme with one hydrodewaxing stage followed by a hydrofinishing stage and product separation systems.

Comparative Example 2 is a comparative example which employs stages 1 and 3 followed by product separation systems 4, 5 and 6 as shown in FIG. 2 simplified process flow scheme. A noble metal hydroisomerization catalyst was installed in the $1^{st}$ stage reactor. After passing the $1^{st}$ stage, the effluent then was hydrofinished in the $3^{rd}$ stage reactor, which was loaded with a Pd/Pt catalyst to further improve the lube product quality. The hydrogen to oil ratio was about 3000 scfb. The lube product was separated from fuels through the distillation section. Product aromatics content was determined.

FIG. 2 key: 1—$1^{st}$ stage, 3—$3^{rd}$ stage, 4—High pressure seperator, 5—Distillation system, 6—Debutanizer.

The $1^{st}$ stage reactor was operated at 600-650° F. to convert the wax molecules to reach the product pour point target. The $3^{rd}$ stage reactor was operated at ~450° F. to saturate the single-ring and multi-ring aromatics to improve the product quality and stability. By using the aromatics content in the product, the conversion of aromatics is calculated by the following formula: $X=(C_{feed}-C_{product})/C_{feed}*100$.

Example 3

Example 3 includes stage 1, 2 and 3 followed by product separation systems 4, 5 and 6 as shown in, for example, FIG. 3 simplified process flow scheme. A noble metal hydroisomerization catalyst was installed in the $1^{st}$ stage reactor.

After passing the 1st stage, the effluent was first treated with a base metal catalyst-Ni BASF in the 2nd stage reactor and then sent to the 3rd stage reactor, which was loaded with a Pd/Pt catalyst to further improve the lube product quality. The hydrogen to oil ratio was about 3000 scfb. The lube product was separated from fuels through the distillation section. Product aromatics content was determined.

FIG. 3 key: 1—1st stage, 2—2nd stage, 3—3rd stage, 4—High pressure seperator, 5—Distillation system, 6—Debutanizer.

The 1st stage reactor was operated at 600-650° F. to convert the wax molecules to reach the product pour point target. The 3rd stage reactor was operated at ~450° F. to saturate the single-ring and multi-ring aromatics to improve the product quality and stability. The 2nd stage reactor was operated at 180° F. to optimize the effluent before sending to the 3rd stage reactor. By using the aromatics content in the product, the conversion of aromatics is calculated by the following formula: $X=(C_{feed}-C_{product})/C_{feed}*100$.

Example 4

Figure 4:
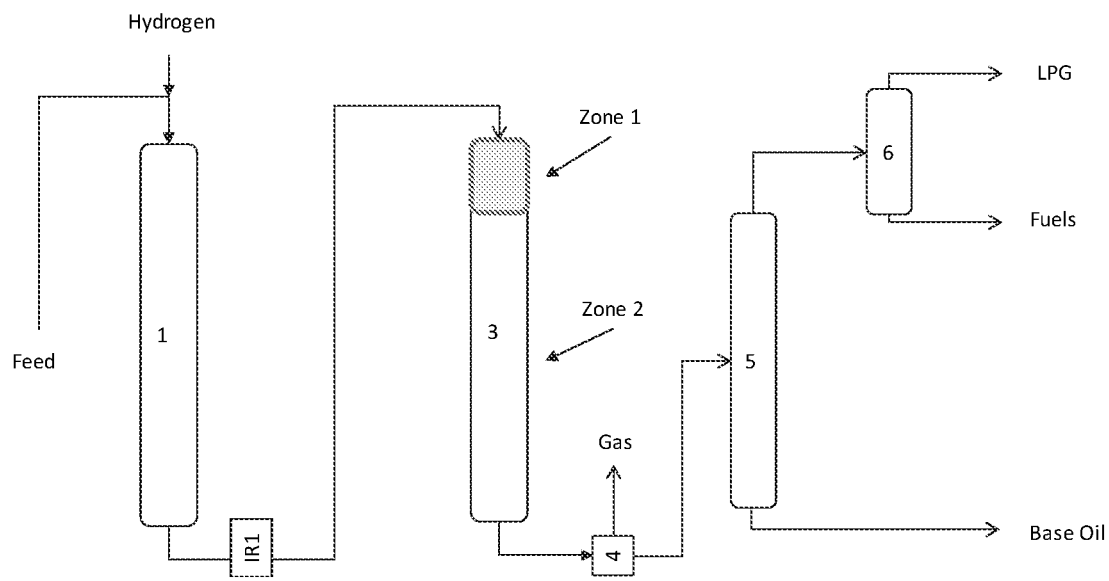
FIG. 4 depicts a simplified process flow scheme with one hydrodewaxing stage followed by a two zone hydrofinishing stage (base metal zone and noble metal zone) and product separation systems.

Example 4 includes stages 1 and 3 followed by product separation systems 4, 5, and 6. This is shown in FIG. 4 simplified process flow scheme. A noble metal hydroisomerization catalyst was installed in the 1st stage reactor. After passing the 1st stage, the effluent was then hydrofinished in the 3rd stage reactor. Comparing to comparative example 2, a layering catalyst system was applied in the 3rd stage reactor for example 4, which includes 10 vol. % base metal catalyst Ni-BASF on top (Zone 1) followed by 90 vol. % noble metal hydrofinishing catalyst (Zone 2). The hydrogen to oil ratio was about 3000 scfb. The lube product was separated from fuels through the distillation section. Product aromatics content was determined.

FIG. 4 key: 1—1st stage, 3—3rd stage (Base metal zone and noble metal zone), 4—High pressure seperator, 5—Distillation system, 6—Debutanizer.

The 1st stage reactor was operated at 600-650° F. to convert the wax molecules to reach the product pour point target. The 3rd stage reactor was operated at ~450° F. to saturate the single-ring and multi-ring aromatics to improve the product quality and stability. By using the aromatics content in the product, the conversion of aromatics is calculated by the following formula: $X=(C_{feed}-C_{product})/C_{feed}*100$.

Summary of Results

Comparative Example 1 shows the highest aromatics content 2.4 wt % with the lowest aromatics conversion 86.8 wt %. After adding the hydrofinishing stage, the conversion was increased to 97.3 wt %. After adding stage 2 installed with base metal catalyst, the aromatics conversion was increased to 99.2 wt %. Alternatively, the 3rd stage performance can be improved by layering base metal catalyst in Zone 1 which increased the aromatics conversion was to 98.1 wt %.

Residual refractory sulfur species may poison the hydrofinishing catalyst in stage 3. By adding a 2nd stage or a layer in Zone 1 with base metal catalyst as disclosed in application, the residual refractory sulfur species was decreased and the hydrofinishing catalyst function was enhanced. The above also confirmed that the base metal catalyst in the 2nd stage saturates aromatic species. The Base Oil Product Aromatics Content and Conversion are shown in Table 2.

TABLE 2

| Examples | 1 | 2 | 3 | 4 |
|---|---|---|---|---|
| Aromatics conversion, wt % | 86.8 | 97.3 | 99.2 | 98.1 |
| Aromatics concentration in base oil product, wt. % | 2.4 | 0.5 | 0.2 | 0.3 |

FIG. 5 shows that the aromatics content may be reduced by 50% using multiple stage processes described herein over conventional processes.

Systems

Systems that are employed in the above-described processes and examples are also contemplated by the present application and are further described below in the following numbered embodiments.

1. A system for producing a low aromatic base oil comprising:
   an isomerization zone for contacting a first SSZ-91 isomerized stream comprising an amount of residual refractory sulfur compounds with a base metal catalyst under conditions to provide a second isomerized stream comprising a lesser amount of residual refractory sulfur compounds than the first isomerized stream; and
   a hydrofinishing zone for contacting the second isomerized stream with a noble metal hydrofinishing catalyst under hydrofinishing conditions to provide a hydrofinished stream.

2. The system of embodiment 1, wherein a base oil produced by the system comprises less than 0.4% by weight aromatics.

3. The system of embodiment 1, wherein a base oil produced by the system comprises a pour point of from about −5° C. to about −20° C.

4. The system of embodiment 1, wherein the total aromatics in a base oil produced by the system are at least about 60% less than a comparable system lacking the step of contacting a first isomerized stream comprising residual refractory sulfur compounds with a base metal catalyst under conditions to provide a second isomerized stream comprising a lesser amount of residual refractory sulfur compounds than the first isomerized stream.

5. The system of embodiment 1, wherein the isomerized stream comprising residual refractory sulfur compounds is produced by contacting a hydrocarbon feedstock with hydrogen and a noble metal hydroisomerization catalyst under hydroisomerization dewaxing conditions to provide the isomerized stream.

6. The system of embodiment 5, wherein the noble metal SSZ-91 hydroisomerization catalyst comprises a crystalline molecular sieve SSZ-91 and platinum.

7. The system of embodiment 1, wherein the noble metal hydrofinishing catalyst comprises a silica alumina support and a noble metal selected from palladium, platinum, or a combination thereof.

8. The system of embodiment 1, wherein the base metal catalyst comprises nickel.

9. The system of embodiment 1, wherein the noble metal hydrofinishing catalyst comprises a noble metal content from about 0.1 to about 1.0 wt. %.

10. The system of embodiment 1, wherein the hydrofinishing conditions comprise a temperature of from about 350° F. to about 500° F.

11. The system of embodiment 1, wherein the first isomerized stream comprising an amount of residual refractory sulfur compounds is contacted with the base metal catalyst at a temperature of from about 130° F. to about 230° F.

12. The system of embodiment 5, wherein the hydroisomerization dewaxing conditions comprise a temperature of from about 550° F. to about 700° F.

13. The system of embodiment 5, wherein the hydroisomerization dewaxing conditions comprise a pressure in the range from about 15 to about 3000 psig.

14. The system of embodiment 5, wherein the hydroisomerization dewaxing conditions comprise a hydrocarbon feedstock feed rate in the range of from about 0.1 to about 20 $hr^{-1}$ LHSV in the presence of hydrogen wherein the hydrogen to hydrocarbon ratio is in a range from about 2000 to about 10,000 standard cubic feet per barrel hydrocarbon.

15. The system of embodiment 1, wherein the hydrofinishing conditions comprise a pressure in the range from about 15 to about 3000 psig.

16. The system of embodiment 1, wherein the hydrofinishing conditions comprise a hydrofinished stream feed rate of from about 0.1 to about 20 $hr^{-1}$ LHSV.

17. The system of embodiment 1, wherein the contacting of the first isomerized stream comprising an amount of residual refractory sulfur compounds with the base metal catalyst is conducted in the same reactor as the contacting of the second isomerized stream with the noble metal hydrofinishing catalyst.

18. The system of embodiment 1, wherein the contacting of the first isomerized stream comprising an amount of residual refractory sulfur compounds with the base metal catalyst is conducted in a different reactor as the contacting of the second isomerized stream with the noble metal hydrofinishing catalyst.

19. The system of embodiment 1, further comprising distilling and debutanizing the hydrofinished stream.

20. A system for producing a low aromatic base oil comprising:
an isomerization zone for contacting a first isomerized stream comprising an amount of residual refractory sulfur compounds with a base metal catalyst comprising nickel under conditions to provide a second isomerized stream comprising a lesser amount of residual refractory sulfur compounds than the first isomerized stream wherein the conditions comprising a temperature of from about 130° F. to about 230° F.; and
a hydrofinishing zone for contacting the second isomerized stream with a noble metal hydrofinishing catalyst comprising a silica alumina support and a noble metal selected from palladium, platinum, or a combination thereof wherein the noble metal content is from about 0.1 to about 1.0 wt. % under hydrofinishing conditions to provide a hydrofinished stream wherein the hydrofinishing conditions comprise a pressure in the range from about 15 to about 3000 psig and a of from about 350° F. to about 500° F. wherein a base oil produced by the system comprises less than 0.4% by weight aromatics.

The present disclosure is not to be limited in terms of the particular embodiments described in this application, which are intended as illustrations of various aspects. Many modifications and variations can be made without departing from its spirit and scope, as may be apparent. Functionally equivalent methods and systems within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

The foregoing description, along with its associated embodiments, has been presented for purposes of illustration only. It is not exhaustive and does not limit the invention to the precise form disclosed. Those skilled in the art may appreciate from the foregoing description that modifications and variations are possible in light of the above teachings or may be acquired from practicing the disclosed embodiments. For example, the steps described need not be performed in the same sequence discussed or with the same degree of separation. Likewise various steps may be omitted, repeated, or combined, as necessary, to achieve the same or similar objectives. Accordingly, the invention is not limited to the above-described embodiments, but instead is defined by the appended claims in light of their full scope of equivalents.

In the preceding specification, various preferred embodiments have been described with references to the accompanying drawings. It may, however, be evident that various modifications and changes may be made thereto, and additional embodiments may be implemented, without departing from the broader scope of the invention as set forth in the claims that follow. The specification and drawings are accordingly to be regarded as an illustrative rather than restrictive.

What is claimed is:

1. A process for producing base oil comprising:
providing a first isomerized stream comprising residual refractory sulfur compounds produced by contacting a hydrocarbon feedstock with hydrogen and a noble metal hydroisomerization catalyst under hydroisomerization dewaxing conditions to provide the isomerized stream, wherein the noble metal hydroisomerization catalyst comprises a crystalline molecular sieve SSZ-91 and platinum;
contacting the first isomerized stream comprising an amount of residual refractory sulfur compounds with a base metal catalyst comprising nickel under conditions to provide a second isomerized stream comprising a lesser amount of residual refractory sulfur compounds than the first isomerized stream; and
contacting the second isomerized stream with a noble metal hydrofinishing catalyst under hydrofinishing conditions to provide a hydrofinished stream, wherein the noble metal hydrofinishing catalyst comprises a noble metal content from about 0.1 to about 1.0 wt. %.

2. The process of claim 1, wherein a base oil produced by the process comprises less than 0.4% by weight aromatics.

3. The process of claim 1, wherein a base oil produced by the process comprises a pour point of from about −5° C. to about −20° C.

4. The process of claim 1, wherein the total aromatics in a base oil produced by the process are at least about 60% less than a comparable process that differs only in that it lacks the step of contacting a first isomerized stream comprising residual refractory sulfur compounds with a base metal catalyst under conditions to provide a second isomerized stream comprising a lesser amount of residual refractory sulfur compounds than the first isomerized stream.

5. The process of claim 1, wherein the noble metal hydrofinishing catalyst comprises a silica alumina support and a noble metal selected from palladium, platinum, or a combination thereof.

6. The process of claim 1, wherein the base metal catalyst comprises nickel.

7. The process of claim 1, wherein the hydrofinishing conditions comprise a temperature of from about 350° F. to about 500° F.

8. The process of claim 1, wherein the first isomerized stream comprising an amount of residual refractory sulfur compounds is contacted with the base metal catalyst at a temperature of from about 130° F. to about 230° F.

9. The process of claim 1, wherein the hydroisomerization dewaxing conditions comprise a temperature of from about 550° F. to about 700° F.

10. The process of claim 1, wherein the hydroisomerization dewaxing conditions comprise a pressure in the range from about 15 to about 3000 psig.

11. The process of claim 1, wherein the hydroisomerization dewaxing conditions comprise a hydrocarbon feedstock feed rate in the range of from about 0.1 to about 20 $hr^{-1}$ LHSV in the presence of hydrogen wherein the hydrogen to hydrocarbon ratio is in a range from about 2000 to about 10,000 standard cubic feet per barrel hydrocarbon.

12. The process of claim 1, wherein the hydrofinishing conditions comprise a pressure in the range from about 15 to about 3000 psig.

13. The process of claim 1, wherein the hydrofinishing conditions comprise a hydrofinished stream feed rate of from about 0.1 to about 20 $hr^{-1}$ LHSV.

14. The process of claim 1, wherein the contacting of the first isomerized stream comprising an amount of residual refractory sulfur compounds with the base metal catalyst is conducted in the same reactor as the contacting of the second isomerized stream with the noble metal hydrofinishing catalyst.

15. The process of claim 1, wherein the contacting of the first isomerized stream comprising an amount of residual refractory sulfur compounds with the base metal catalyst is conducted in a different reactor as the contacting of the second isomerized stream with the noble metal hydrofinishing catalyst.

16. The process of claim 1, further comprising distilling and debutanizing the hydrofinished stream.

17. A process for producing base oil comprising:
providing a first isomerized stream comprising residual refractory sulfur compounds produced by contacting a hydrocarbon feedstock with hydrogen and a noble metal hydroisomerization catalyst under hydroisomerization dewaxing conditions to provide the isomerized stream, wherein the noble metal hydroisomerization catalyst comprises a crystalline molecular sieve SSZ-91 and platinum;
contacting the first isomerized stream comprising an amount of residual refractory sulfur compounds with a base metal catalyst comprising nickel under conditions to provide a second isomerized stream comprising a lesser amount of residual refractory sulfur compounds than the first isomerized stream wherein the conditions comprising a temperature of from about 130° F. to about 230° F.; and
contacting the second isomerized stream with a noble metal hydrofinishing catalyst comprising a silica alumina support and a noble metal selected from palladium, platinum, or a combination thereof wherein the noble metal content is from about 0.1 to about 1.0 wt. % under hydrofinishing conditions to provide a hydrofinished stream wherein the hydrofinishing conditions comprise a pressure in the range from about 15 to about 3000 psig and a temperature of from about 350° F. to about 500° F.;
wherein a base oil produced by the process comprises less than 0.4% by weight aromatics.

* * * * *